(12) United States Patent
Takeshima et al.

(10) Patent No.: US 8,727,088 B2
(45) Date of Patent: May 20, 2014

(54) WORK VEHICLE

(75) Inventors: Hiroaki Takeshima, Komatsu (JP);
Yoshito Komatsu, Komatsu (JP)

(73) Assignee: Komatsu Ltd., Tokyo (JP)

( * ) Notice: Subject to any disclaimer, the term of this patent is extended or adjusted under 35 U.S.C. 154(b) by 22 days.

(21) Appl. No.: 13/700,399

(22) PCT Filed: Apr. 18, 2012

(86) PCT No.: PCT/JP2012/060442
§ 371 (c)(1),
(2), (4) Date: Nov. 27, 2012

(87) PCT Pub. No.: WO2013/021691
PCT Pub. Date: Feb. 14, 2013

(65) Prior Publication Data
US 2013/0146412 A1  Jun. 13, 2013

(30) Foreign Application Priority Data

Aug. 11, 2011  (JP) .................................. 2011-175533

(51) Int. Cl.
*F16H 45/02*  (2006.01)
(52) U.S. Cl.
USPC ....................................................... 192/3.3
(58) Field of Classification Search
USPC ........................................ 192/3.3, 3.33, 3.29
See application file for complete search history.

(56) References Cited

U.S. PATENT DOCUMENTS

| | | | | |
|---|---|---|---|---|
| 2,824,631 | A | * | 2/1958 | De Lorean .................... 192/3.3 |
| 4,529,070 | A | * | 7/1985 | Kobayashi ................... 192/3.23 |
| 4,974,710 | A | * | 12/1990 | Murasugi ....................... 192/3.3 |
| 6,343,679 | B1 | * | 2/2002 | Kundermann ................ 192/3.3 |
| 6,398,531 | B1 | * | 6/2002 | Andres et al. .................. 418/69 |
| 2008/0083593 | A1 | * | 4/2008 | Huegel et al. ............... 192/3.29 |

FOREIGN PATENT DOCUMENTS

| | | |
|---|---|---|
| JP | 57-164353 U | 10/1982 |
| JP | 61-55537 U | 4/1986 |
| JP | 63-231059 A | 9/1988 |
| JP | 9-236173 A | 9/1997 |
| JP | 11-148547 A | 6/1999 |
| JP | 2006-521513 A | 9/2006 |
| JP | 2008-95959 A | 4/2008 |

* cited by examiner

*Primary Examiner* — Rodney Bonck
(74) *Attorney, Agent, or Firm* — Global IP Counselor, LLP

(57) ABSTRACT

A work vehicle has a hydraulic pump and a transmission. The transmission includes a transmission body having a cylindrical input shaft, a torque converter body, a lock-up clutch device, a pump drive shaft, and an oil channel. The lock-up clutch device includes a piston, an oil chamber formed at a back surface of the piston, and a clutch portion. The pump drive shaft penetrates the input shaft and is disposed coaxially to the input shaft. The pump drive shaft transmits driving power to the hydraulic pump. The oil channel is formed between an inner circumference surface of the input shaft and an outer circumference surface of the pump drive shaft, and communicates with the oil chamber in the lock-up clutch device.

6 Claims, 3 Drawing Sheets

WORK VEHICLE

CROSS-REFERENCE TO RELATED APPLICATIONS

This application claims priority to Japanese Patent Application No. 2011-175533 filed on Aug. 11, 2011, the disclosure of which is hereby incorporated herein by reference in its entirety.

TECHNICAL FIELD

The present invention relates to a work vehicle.

BACKGROUND ART

Work vehicles are provided with a torque converter for transmitting power from a power source such as an engine and the like to a transmission input shaft. A torque converter generally has a torque converter body that transmits the power through a liquid, and a lock-up clutch device. The lock-up clutch device mainly includes a piston that operates by hydraulic pressure, and a clutch unit that switches between on (power transmission) and off (power transmission disconnection) due to the operation of the piston. When the vehicle speed reaches or exceeds a certain speed, the clutch unit of the lock-up clutch device then switches on, and the power from the engine is transmitted directly through the lock-up clutch device to the transmission input shaft without going through the torque converter body.

A hydraulic pump is required in this type of torque converter for supplying operating fluid to the torque converter body or to the piston in the lock-up clutch device. The hydraulic pump is most commonly arranged, for example, eccentrically from an extended shaft of the input shaft in a transmission case.

With this type of hydraulic pump disposition however, a gear mechanism for producing the rotation in the pump drive shaft from the input shaft is required in addition to a pump drive shaft for driving the hydraulic pump. Thus, the width of the entire device is increased and the number of parts that constitute the gear mechanism is also increased. Accordingly, as discussed in Japanese National Publication of International Patent Application No. 2006-521513, a configuration in which a hydraulic pump and a drive shaft of the hydraulic pump coaxial to the torque converter rotary shaft are disposed has been proposed.

SUMMARY

In a configuration such as Japanese National Publication of International Patent Application No. 2006-521513, forming the transmission input shaft in a cylindrical form and disposing the hydraulic pump drive shaft in a through-hole inside the input shaft is required since the hydraulic pump is disposed on the extension line of the transmission input shaft.

Here, the lock-up clutch device is a system that actuates the piston by using operating fluid that flows into or drains from the torque converter body, and is a system that actuates the piston through operating fluid supplied by a hydraulic circuit system different than that of the operating fluid of the torque converter body. The latter system requires the supply of operating fluid from a hydraulic pump in an oil chamber at the back side of the piston. The oil chamber at the back side of the piston is then provided at the front side of the torque converter body.

Thus, in the latter type of lock-up clutch device, in order to supply operating fluid from the hydraulic pump using the configuration of the above mentioned publication, a hole is formed along the shaft direction on the inside of the hydraulic pump drive shaft, and the hole is necessarily used as an oil channel.

However, to guide the operating fluid from the oil channel formed inside the pump drive shaft to the piston of the lock-up clutch device, it is necessary to form an oil channel that penetrates, in the radial direction, both the pump drive shaft and the transmission input shaft that have become a double structure, guide the operating fluid once to the outside of the pump drive shaft, and guide the operating fluid further outside to the outer circumference of the transmission input shaft. This type of configuration leads to a complicated structure and operating fluid leakage will increase.

Moreover, a gun drill is used when forming a hole on the inside of the pump drive shaft, but generally it is difficult to form a small diameter hole with a gun drill. As a result, the wall thickness of the pump drive shaft is made thinner when forming a hole with a gun drill on the inside of the pump drive shaft. When heat treatment is applied to this type of pump drive shaft, axial deformation of the pump drive shaft increases.

An object of the present invention is to guide operating fluid with a simple configuration to a lock-up clutch device in a configuration in which the drive shall of a hydraulic pump is arranged inside a transmission input shaft. Moreover, an object of the present invention is to form an oil channel without incurring deformation and the like of the pump drive shaft.

A work vehicle according to a first aspect of the present invention has an engine, a transmission coupled to the engine, and a hydraulic pump. The transmission includes an input member to which power is inputted from the engine, a transmission body having a cylindrical input shaft, a torque converter body, a lock-up clutch device, a pump drive shaft, and an oil channel. The torque converter body is coupled to the input member and transmits power from the input member through a fluid to the input shaft. The lock-up clutch device includes a piston that operates by hydraulic pressure, an oil chamber formed at the back side of the piston, and a clutch unit that transmits power from the input member due to an action of the piston to the input shaft. The pump drive shaft penetrates the inside of the input shaft coaxially with the input shaft, and transmits driving power to the hydraulic pump. The oil channel is formed between the inner circumference surface of the input shaft and the outer circumference surface of the pump drive shaft, and communicates with the oil chamber in the lock-up clutch device.

Here, the hydraulic pump is driven by the pump drive shaft, and operating fluid discharged from the hydraulic pump is guided through the oil channel that is a gap between the pump drive shaft and the input shaft to the oil chamber in the lock-up clutch device.

With this type of configuration, a hole is not required to be formed as an oil channel inside the pump drive shaft. Therefore, operating fluid from the hydraulic pump can be guided to the lock-up clutch device with a simple configuration and with little leakage of the operating fluid. Moreover, distortion occurring in the pump drive shaft during heating treatment can be suppressed. Furthermore, the oil channel can be configured easily even with a pump drive shaft having a small diameter in a small-size work vehicle.

In the work vehicle according to a second aspect of the present invention, a tip portion of the pump drive shaft is extended to project from the tip surface of the input shaft to the engine in the work vehicle of the first aspect. Moreover, the input member has a coupling hole, a fitting hole, an oil reservoir portion, and a communicating hole. The coupling hole is arranged in the center portion of the input member and is coupled with the tip portion of the pump drive shaft. The fitting hole is disposed coaxially with the coupling hole, and is formed with a diameter larger than the coupling hole to fit with the tip portion of the input shaft. The oil reservoir portion is formed by the inner circumference surface of the fitting hole, the tip surface of the input shaft, and the outer circumference surface of the pump drive shaft, and communicates with the oil channel. The communicating hole allows communication between the oil reservoir portion and the oil chamber of the lock-up clutch device.

Here, the operating fluid that has passed through the oil channel between the pump drive shaft and the input shaft is guided to the oil reservoir portion, and further passes through the communicating hole to be guided to the oil chamber of the lock-up clutch device. The gross sectional area of the communicating hole is smaller than the outer circumference surface area (with the width as the diameter of the communicating hole) of the pump drive shaft even when, for example, a plurality of communicating holes are provided. The operating fluid on an outer circumference portion of the pump drive shaft collects in the communicating hole. Moreover, since the distance between the pump drive shaft outer circumference surface and the inner circumference surface of the input shaft is short, the pressure drop of the operating fluid increases. This results in causing the operation of the lock-up clutch to be delayed. Thus, by providing the oil reservoir portion, the flow of the operating fluid from the oil channel between the pump drive shaft and the input shaft toward the communicating hole becomes smooth, and the pressure drop is reduced.

A work vehicle according to a third aspect of the present invention further includes a turbine hub and a bearing in the work vehicle of the second aspect. The turbine hub has a tubular portion in the center portion, and an inner circumference portion thereof is coupled to an outer circumference portion of the input shaft and transmits power from the torque converter body to the input shaft. An inner circumference of the bearing fits with the outer circumference of the tubular portion. The input member further includes a bearing hole. The bearing hole is coaxial to the fitting hole, is arranged on the input member, and fits with the outer circumference of the bearing. The input shaft is supported by the input member through the turbine hub and the bearing.

The pump drive shaft is coupled with the input member with the coupling hole. The input shaft is supported by the input member through the turbine hub and the bearing. Since both the pump drive shaft and the input shaft are supported by the input member, the distance between the inner circumference surface of the input shaft and the outer circumference surface of the pump drive shaft can easily be maintained in a uniform manner.

As described above, the communicating hole is formed in the input member, and operating fluid guided to the tip portion of the input shaft is guided to the oil chamber of the input member. Consequently, a hydraulic circuit with a simple configuration can be achieved.

In the present invention as described above, operating fluid can be easily guided to the oil chamber of the lock-up clutch device with a simple configuration in a configuration in which the hydraulic pump is arranged on an extension line of the transmission input shaft and the drive shaft of the hydraulic pump is arranged inside the transmission input shaft. Moreover, since forming a hole as an oil channel inside the pump drive shaft is not necessary, deformation of the pump drive shaft during heat treatment and the like can be suppressed.

DESCRIPTION OF EMBODIMENTS

Overall Structure

Figure 1:
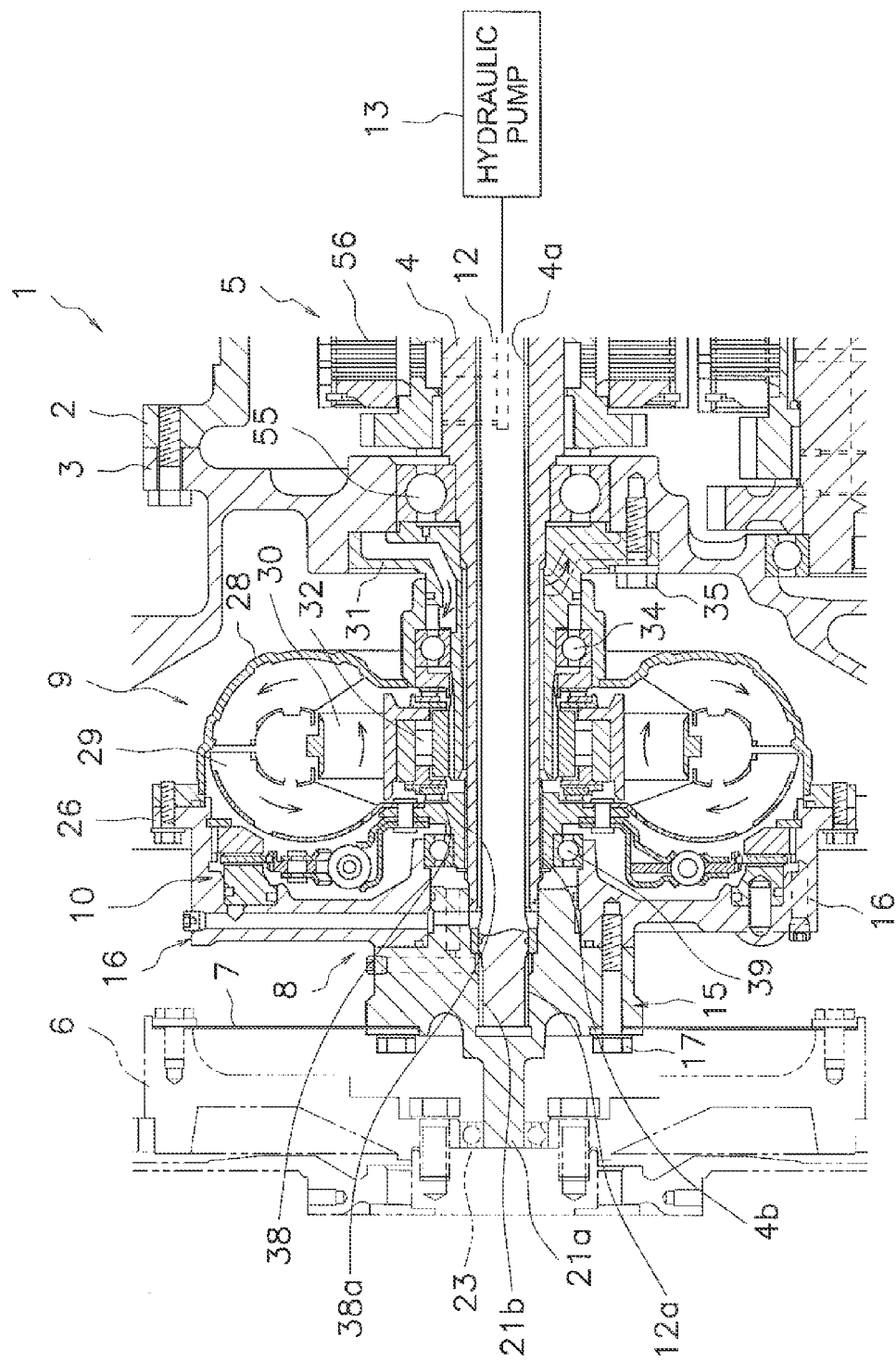
FIG. 1 is a sectional schematic diagram illustrating a portion of a transmission used in a work vehicle according to an embodiment of the present invention.

FIG. 1 is a sectional schematic diagram illustrating a portion of a transmission 1 used in a work vehicle according to an embodiment of the present invention. This transmission 1 is, for example, a backhoe loader transmission and includes a body case 2 and a front case 3 fixed to the engine side (left side in FIG. 1) of the body case 2. A transmission body 5 that includes an input shaft 4 is accommodated in the body case 2. The transmission body 5 includes a plurality of hydraulic clutches for switching between forward and backward movement, a plurality of hydraulic clutches for switching between speed levels, and members such as a gearwheel mechanism and the like. Moreover, a flexible plate 7 coupled to a flywheel 6 on the engine side, an input member 8 fixed to the flexible plate 7, a torque converter body 9 fixed to the input member 8, and a lock-up clutch device 10 are disposed in the front case 3. Further, this transmission 1 has a pump drive shaft 12 (hereinbelow, referred to as "PTO shaft") disposed coaxially with the input shaft 4.

A hydraulic pump 13 mounted in the body case 2 is provided on an extension line of the input shaft 4. The hydraulic pump is driven by the PTO shaft 12.

Input Member

The input member 8 has a PTO shaft coupling portion 15 on the engine side and an input shaft bearing portion 16 on the transmission side. The PTO shaft coupling portion 15 and the input shaft bearing portion 16 are fixed to each other by bolts 17 for fixing the PTO shaft coupling portion 15 to the flexible plate 7.

Figure 2:
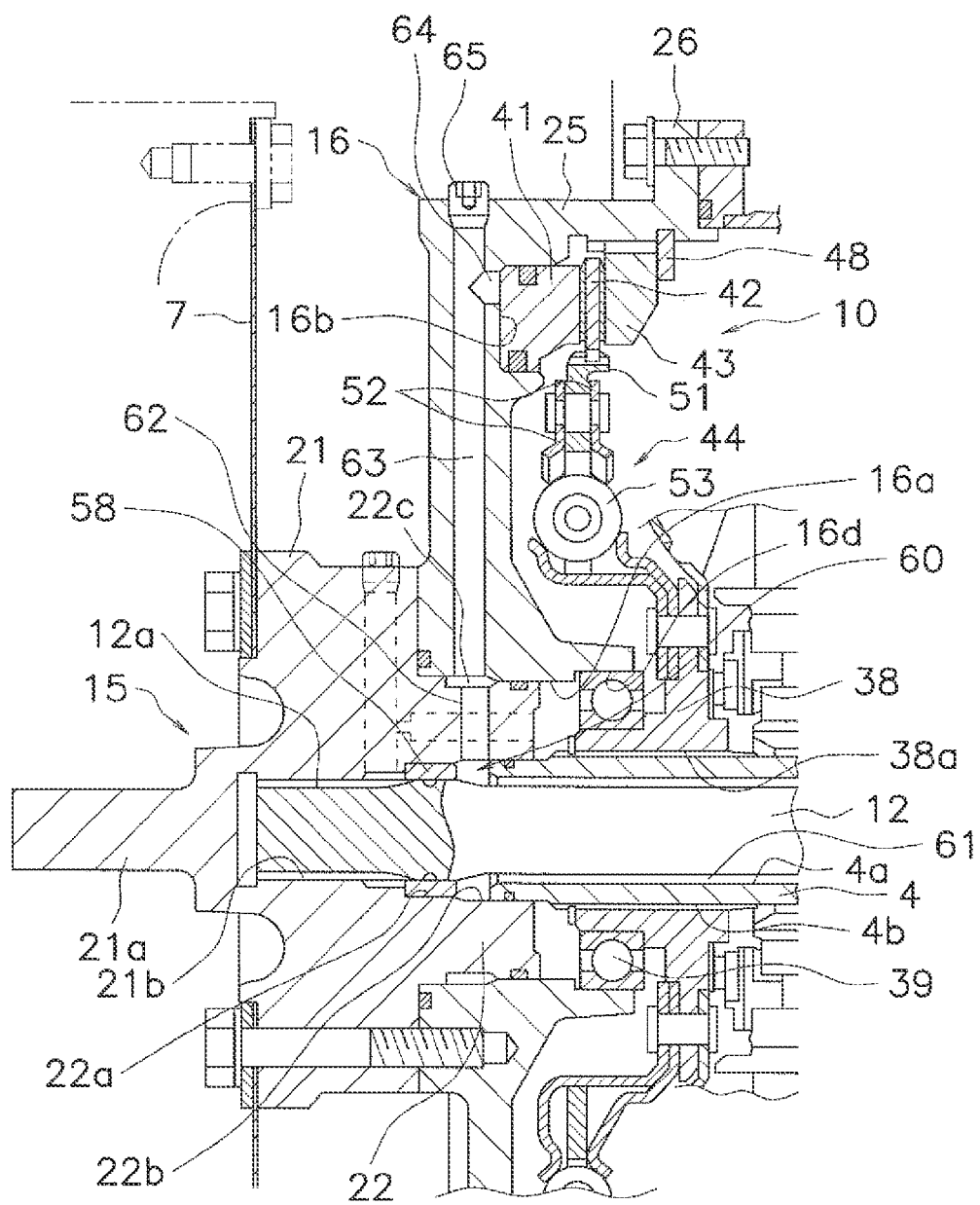
FIG. 2 is an enlarged fragmentary view of FIG. 1.

As illustrated in FIG. 1 and FIG. 2, which is an enlarged portion of FIG. 1, the PTO shaft coupling portion 15 is a discoid member having a large diameter portion 21 and a small diameter portion 22. A projecting portion 21a that projects to the engine side is formed in a center portion of the large diameter portion 21, and a tip portion of the projecting portion 21a is supported by a shaft bearing 23 at an inner circumference portion the flywheel 6 as illustrated in FIG. 1. The inner circumference portion of the flexible plate 7 is fixed to the engine side surface of the large diameter portion 21, and the outer circumference portion of the flexible plate 7 is fixed to the outer circumference portion of the flywheel 6. Moreover, a spline hole 21b (coupling hole) is formed in the center portion of the large diameter portion 21. A collar insertion hole 22a with an inner diameter larger than the spline hole 21b, and a fitting hole 22b with an inner diameter larger than the collar insertion hole 22a are formed in the center portion of the small diameter portion 22.

The input shaft bearing portion 16 is an annular member, and the small diameter portion 22 of the PTO shaft coupling portion 15 is inserted into a hole 16a in the inner circumference portion. The input shaft bearing portion 16 has a cylindrical portion 25 that extends to the transmission side on the outer circumference portion. An annular concave portion 16b is formed on the torque converter body 9 side surface of the input shaft bearing portion 16 at the inner circumference side of the cylindrical portion 25. The annular concave portion 16b functions as an oil chamber (described below) of the lock-up clutch device 10. The tip portion of the cylindrical portion 25 includes a flange portion 26 that extends to the outer circumference side.

Torque Converter Body

As illustrated in FIG. 11, the torque converter body 9 mainly has a pump 28, a turbine 29, a stator 30, and a one-way clutch 32 disposed between the stator 30 and a fixed shaft 31.

The outer circumference portion of the pump 28 is coupled to the flange portion 26 of the input shaft bearing portion 16. The inner circumference portion of the pump 28 is supported in a freely rotating manner by the fixed shaft 31 through a bearing 34. The fixed shaft 31 is fixed to the front case 3 by bolts 35. The turbine 29 is disposed facing the pump 28. A turbine hub 38 is fixed to the inner circumference portion of the turbine 29. A roughly tube-shaped tubular portion is formed in the center portion of the turbine hub 38, and a spline hole 38a is formed on the inner circumference portion of the tubular portion. The outer circumference surface of the tubular portion of the turbine hub 38 is partially reduced in diameter to be fitted with the inner circumference of a bearing 39. The outer circumference of the bearing 39 is fitted into the inner circumference surface of a bearing hole 16d provided in the input shaft bearing portion 16. In this way, the turbine hub 38 is supported in a freely rotating manner by the input shaft bearing portion 16 through the bearing 39.

Lock-Up Clutch Device

Figure 3:
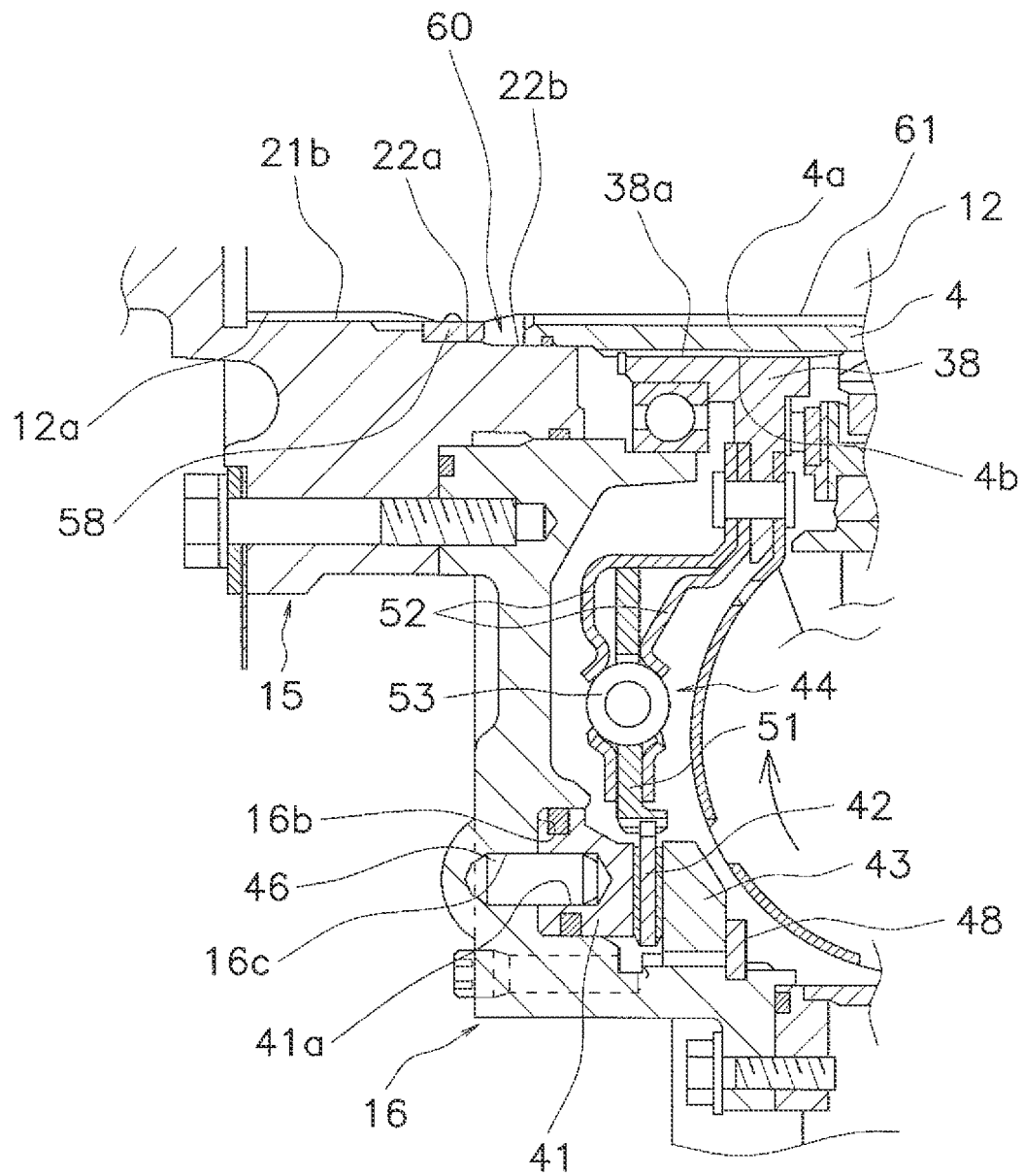
FIG. 3 is an enlarged fragmentary view of FIG. 1.

As illustrated in FIGS. 2 and 3, the lock-up clutch device 10 has an oil chamber 16b, a piston 41, a first clutch plate 42 and a second clutch plate 43 that constitute a clutch portion, and a damper mechanism 44. FIG. 2 illustrates an enlarged portion on one side in the radial direction of FIG. 1, and FIG. 3 illustrates an enlarged portion on the other side in the radial direction of FIG. 1.

The oil chamber 16b is an annular concave portion formed in the input shaft bearing portion 16 as described above. The piston 41 is disposed in the oil chamber 16b. Moreover, as illustrated in FIG. 3, holes 41a and 16c are formed in the piston 41 and the input shaft bearing portion 16 respectively in facing positions, and one rod 46 is inserted in each of the holes 41a and 16c. As a result, the piston 41 moves freely in the axial direction and is incapable of relative rotation with respect to the input shaft bearing portion 16.

The first clutch plate 42 is an annular member and is provided with friction materials on both surfaces. Internal teeth are formed in the inner circumference portion of the first clutch plate 42, and the internal teeth engage with external teeth formed on an input plate (described below) that constitutes the damper mechanism 44. Therefore, the first clutch plate 42 is coupled to the damper mechanism 44 with freedom of movement in the axial direction and without relative rotation.

The second clutch plate 43 is an annular member and external teeth are formed on the outer circumference portion. Conversely, internal teeth are formed on the inner circumference surface of the cylindrical portion 25 of the input shaft bearing portion 16, and the external teeth of the second clutch plate 43 mesh with these internal teeth. Therefore, the second clutch plate 43 is coupled to the input shaft bearing portion 16 with freedom of movement in the axial direction and without relative rotation. A back plate 48 is provided on the transmission side of the second clutch plate 43 to regulate movement in the axial direction of the second clutch plate 43.

The damper mechanism 44 is a mechanism that transmits power from the first clutch plate 42 to the turbine hub 38. The damper mechanism 44 has an input plate 51, a pair of output plates 52 disposed on both sides of the input plate 51, and a plurality of torsion springs 53 supported by these plates. The input plate 51 is coupled to the first clutch plate 42, and the pair of output plates 52 is fixed by rivets to the turbine hub 38.

Input Shaft

As illustrated in FIGS. 1 to 3, the input shaft 4 is disposed coaxially with a crankshaft of the engine and is rotatably supported by the front case 3 through a shaft bearing 55. Moreover, the input shaft 4 is formed in a cylinder shape, and a through-hole 4a is formed in the center portion of the input shaft 4. Hydraulic clutches 56 such as the clutches for switching between forward and reverse movement (only a portion is illustrated in FIG. 1), and a plurality of gears are provided on this input shaft 4. A spline shaft 4b is formed in the outer circumference of the tip portion of the input shaft 4. This spline shaft 4b engages with the spline hole 38a formed in the inner circumference surface of the turbine hub 38. The other tip portion of the spline shaft 4b of the input shaft 4 is rotatably supported by being inserted into the fitting hole 22b of the PTO shaft coupling portion 15. A sealing member is attached to the outer circumference surface of the input shaft 4, and the outer circumference surface of the input shaft 4 and the inner circumference surface of the fitting hole 22b are sealed.

Therefore the input shaft 4 is supported by the input shaft bearing portion 16 through the turbine hub 38 and the bearing 39.

PTO Shaft

The PTO shaft 12 is disposed to penetrate the through-hole 4a of the input shaft 4. A gap is formed between the outer circumference surface of the PTO shaft 12 and the inner circumference surface of the input shaft 4. A tip of the PTO shaft 12 is extended to project further toward the engine side from the tip surface of the input shaft 4, and a spline shaft 12a is formed on this tip portion. The spline shaft 12a engages with the spline hole 21b of the PTO shaft coupling portion 15. Moreover, a portion of the transmission side of the spline shaft 12a of the PTO shaft 12 is inserted into the collar insertion hole 22a of the PTO shaft coupling portion 15. Then, a collar 58 is inserted in the space between the outer circumference surface of the PTO shaft 12 and the inner circumference surface of the collar insertion hole 22a. The outer circumference surface of the collar 58 is tightly sealed to the inner circumference surface of the collar insertion hole 22a, and the inner circumference surface of the collar 58 is tightly seated to the outer circumference surface of the PTO shaft 12. Sealing members are provided on the outer circumference surface of the PTO shaft 12, and the space between the outer circumference surface of the PTO shaft 12 and the collar inner circumference surface is sealed.

With the above configuration, a space formed by the tip surface of the input shaft 12, an edge surface of the collar 58, the outer circumference surface of the PTO shaft 12, and the inner circumference surface of the fitting hole 22b functions as an oil reservoir portion 60.

Hydraulic Pump

The hydraulic pump 13 is coupled to the end portion on the opposite side of the tip of the PTO shaft 12. The hydraulic pump 13 is driven by rotation of the PTO shaft 12 to discharge operating fluid into the gap between the outer circumference surface of the PTO shaft 12 and the inner circumference surface of the input shaft 4.

Hydraulic Circuit

The operating fluid discharged by the hydraulic pump 13 is supplied through a hydraulic circuit to the oil chamber 16b of the lock-up clutch device 10. As illustrated in FIG. 2, the hydraulic circuit is constituted by a first oil channel 61, the abovementioned oil reservoir portion 60, a second oil channel 62, a third oil channel 63, and a fourth oil channel 64.

The first oil channel 61 is formed by a gap between the outer circumference surface of the PTO shaft 12 and the inner circumference surface of the input shaft 4. The end portion on the engine side of the first oil channel 61 communicates with the oil reservoir portion 60.

The second oil channel 62 is formed by a first through-hole formed in the small diameter portion 22 of the PTO shaft coupling portion 15. Specifically, an annular groove 22c is formed in the small diameter portion 22 of the PTO shaft coupling portion 15, and one first through-hole 62 is formed so as to communicate with the oil reservoir portion 60 from this annular groove 22c. A plurality of first through-holes may be formed.

The third oil channel 63 is formed by a second through-hole that penetrates from the outer circumference surface to the inner circumference surface of the input shaft bearing portion 16. The second through-hole 63 communicates with the annular groove 22c of the PTO shaft coupling portion 15. The outer end of the second through-hole 63 is sealed by attaching a threaded member 65.

The fourth oil channel 64 is formed by a communicating hole that allows the oil chamber 16b formed in the input shaft bearing portion 16 to communicate with the third oil channel 63.

Operation

The lock-up clutch device 10 is turned off in a low speed region of the vehicle. That is, operating fluid is not supplied to the oil chamber 16b of the lock-up clutch device 10. In this case, power inputted from the engine to the input member 8 is transmitted to the input shaft 4 via the torque converter body 9.

When the speed of the vehicle increases to a certain speed or higher, the operating fluid from the hydraulic pump 13 is supplied to the lock-up clutch device 10. Specifically, the operating fluid discharged by the hydraulic pump 13 is guided through the first oil channel 61 to the oil reservoir portion 60. Next, the operating fluid is supplied from the oil reservoir portion 60 through the second oil channel 62, the third oil channel 63, and the fourth oil channel 64 to the oil chamber 16b. The piston 41 is moved to the transmission side by the operating fluid supplied from this oil chamber 16b. As a result, the first clutch plate 42 is pressed between the piston 41 and the second clutch plate 43.

In this condition, power inputted from the engine to the input member 8 is transmitted to the turbine hub 38 and the input shaft 4 via the lock-up clutch device 10. That is, the power from the engine is transmitted directly through the lock-up clutch device 10 to the input shaft 4 without passing through the fluid of the torque converter body 9.

Characteristics

The operating fluid discharged from the hydraulic pump 13 is guided through the oil channel 61 that is a gap between the pump drive shaft 12 and the input shaft 4 to the lock-up clutch device 10. As a result, there is no need to form a hole as an oil channel inside the PTO shaft 12. Therefore, operating fluid from the hydraulic pump 13 can be guided to the lock-up clutch device 10 with a simple configuration and with little leakage of the operating fluid. Moreover, since the PTO shaft 12 can be formed as a solid shaft, deformation due to a heat treatment process can be suppressed.

Since the oil reservoir portion 60 is provided, the flow of the operating fluid from the oil channel 61 between the PTO shaft 12 and the input shaft 4 to the second oil channel 62 becomes smooth, and the pressure drop of the operating fluid is reduced. As a result, delays in the operation of the lock-up clutch mechanism can be avoided.

The through-holes 62, 63 and the continuous hole 64 formed in the PTO shaft coupling portion 15 and the input shaft bearing portion 16 are formed orthogonal to the rotary shaft or in a direction along the rotary shaft. As a result, there is no need to form holes in a diagonal direction and processing becomes simple.

OTHER EMBODIMENTS

The present invention is not limited to the above embodiment and various changes and modifications may be made without departing from the spirit of the invention.

In particular, the configuration of the holes as an oil channel formed in the PTO shaft coupling portion and the input shaft bearing portion is not limited to the embodiment, and various configurations can be used.

In the work vehicle of the illustrated embodiments, operating fluid can be guided to the oil chamber of the lock-up clutch device with a simple configuration in a configuration in which the hydraulic pump is disposed on an extension tine of the transmission input shaft and the drive shaft of the hydraulic pump is disposed inside the transmission input shaft. Moreover, in the work vehicle of the illustrated embodiments, since forming a hole as an oil channel inside the pump drive shaft is not necessary, deformation of the pump drive shaft during heat treatment and the like can be suppressed.

What is claimed is:
1. A work vehicle comprising:
an engine;
a transmission coupled to the engine; and
a hydraulic pump, wherein
the transmission includes
    an input member to which power from the engine is inputted,
    a transmission body having a cylindrical input shaft,
    a torque converter body coupled to the input member to transmit power from the input member through a fluid to the input shaft,
    a lock-up clutch device having a piston that operates by hydraulic pressure, an oil chamber formed at a back surface of the piston, and a clutch portion configured to transmit power from the input member to the input shaft by operation of the piston,
    a pump drive shaft penetrating inside of the input shaft and disposed coaxially with the input shaft, the pump drive shaft being configured to transmit driving power to the hydraulic pump, and an oil channel formed between an inner circumference surface of the input shaft and an outer circumference surface of the pump drive shaft, and communicating with the oil chamber of the lock-up clutch device, wherein a tip portion of the pump drive shaft extends to project from an end surface of the input shaft to the engine side, and the input member includes a coupling hole disposed in a center portion and coupled with the tip portion of the pump drive shaft, a fitting hole disposed coaxially with the coupling hole, and having a larger diameter than the coupling hole to fit with an outer circumference surface of a tip portion of the input shaft, an oil reservoir portion formed by an inner circumference surface of the fitting hole, a tip surface of the input shaft, and the outer circumference surface of the pump drive shaft, and communicating with the oil channel, and a communicating hole allowing communication between the oil reservoir portion and the oil chamber of the lock-up clutch device.

2. The work vehicle according to claim 1, further comprising:

a turbine hub having a tubular portion in a center portion and an inner circumference surface thereof communicating with an outer circumference surface of the input shaft, and the turbine hub being configured to transmit power from the torque converter body to the input shaft; and a bearing having an inner circumference fitting onto an outer circumference of the tubular portion, wherein the input member includes a bearing hole disposed coaxially with the fitting hole and disposed on the input member, the bearing hole fitting with an outer circumference of the bearing, and the input shaft is supported by the input member via the turbine hub and the bearing.

3. The work vehicle according to claim 1, wherein the input member includes a pump drive shaft coupling portion coupled to the pump drive shaft and an input shaft bearing portion rotatably supporting the input shaft.

4. The work vehicle according to claim 3, wherein the pump drive shaft coupling portion and the input shaft bearing portion are separate members fixed together with a fastener.

5. The work vehicle according to claim 4, wherein the fastener is a bolt.

6. The work vehicle according to claim 1, wherein the pump drive shaft is a solid shaft.

\* \* \* \* \*